F. H. BURRILL.
TIRE TOOL.
APPLICATION FILED DEC. 29, 1915.

1,189,424.

Patented July 4, 1916.

Inventor
Frank H. Burrill,
By his attorney, Charles N. Goodwin.

UNITED STATES PATENT OFFICE.

FRANK H. BURRILL, OF CONCORD JUNCTION, MASSACHUSETTS, ASSIGNOR TO THE BURRILL TIRE TOOL CO., A CORPORATION OF MASSACHUSETTS.

TIRE-TOOL.

1,189,424. Specification of Letters Patent. Patented July 4, 1916.

Application filed December 29, 1915. Serial No. 69,256.

*To all whom it may concern:*

Be it known that I, FRANK H. BURRILL, a citizen of the United States, residing at Concord Junction, in the county of Middlesex and State of Massachusetts, have invented new and useful Improvements in Tire-Tools, of which the following is a specification.

This invention relates to improvements in tire tools and more especially to the tool for removing split demountable rims from tires and the replacing of said rims on said tires.

The object of the invention is to provide a simple and powerful tool which may be operated with but very slight exertion to contract said split rim during the removing process thereof, or expand said rim to cause the abutting ends thereof to be easily and quickly moved into their respective positions.

The invention consists in the combination and arrangement of parts set forth in the following specification and particularly pointed out in the claim.

Figure 1:
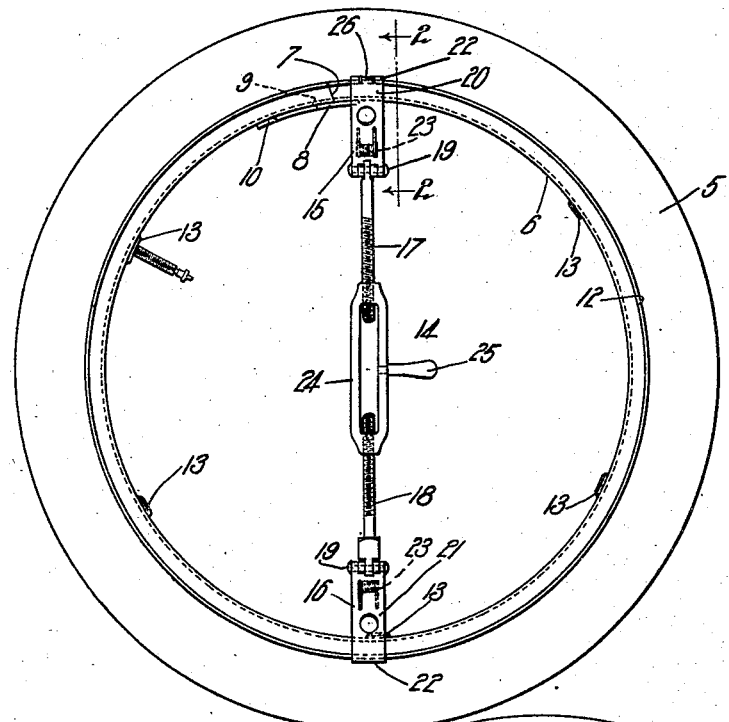
Figure 3:
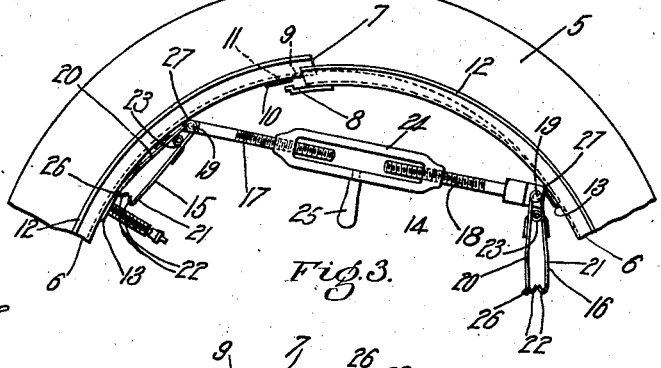
Figure 2:
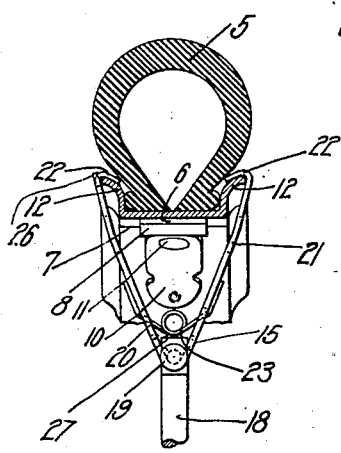
Figure 4:
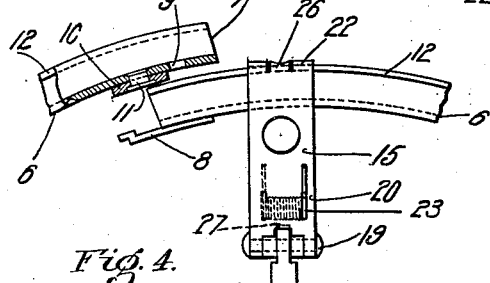

Referring to the drawings: Figure 1 is a side elevation of a tire and rim with a tire tool embodying my invention illustrated in a position on said rim in readiness to contract and remove the same from said tire. Fig. 2 is a section taken on the line 2—2 of Fig. 1. Fig. 3 is a detail side elevation of a portion of a split rim illustrating the tool in a position to expand and replace the same upon the tire. Fig. 4 is a detail side elevation of the split portion of the rim and its immediate parts illustrating the abutting ends thereof moved out of engagement with each other by means of the tool embodying the invention.

Like numerals refer to like parts throughout the several views of the drawings.

In the drawings, 5 is a tire shoe and 6 a demountable rim which is split transversely thereof at 7 to permit the same to be contracted and removed from the tire shoe 5. A tongue 8 is secured to one end of the rim adjacent to the split 7 thereof, and is adapted to extend beyond said split and fit into a recess 9 in the opposite end thereof, where it is held preferably by a latch 10 pivoted at 11 upon the recessed end of said rim.

The rim 6 is provided with outwardly turned annular flanges 12, 12 between which the tire shoe 5 is arranged to set upon said rim and be held in position thereby. The rim 6 is furthermore provided with a plurality of projections 13 arranged about the inner periphery thereof and provided for the purpose of preventing a circumferential movement of the rim relatively to the permanent rim of the vehicle wheel.

The tire tool 14 embodying this invention preferably comprises two opposed sets of tongs 15 and 16 pivotally mounted respectively upon coaxially disposed screw threaded members 17 and 18 by pivotal pins 19. Each of said sets of tongs consists of two members 20 and 21, preferably constructed of sheet metal and each having at its outer end an inturned lip 22 forming a hook adapted to hook over the outer edge of the flange 12 of said rim, one at each side of said rim. A spring 23 is interposed between the members 20 and 21 of each set to normally exert a yielding contracting pressure upon said members so as to retain the same in contact with the flanges 12. The screw threads upon the members 17 and 18 are preferably arranged in opposite directions, one right and the other left, and a nut or turn buckle 24 is adapted to engage the threads of said members 17 and 18 and to be rotated relatively thereto to move said members toward or away from each other.

A handle 25 is preferably attached to the nut 24 to facilitate the rotation thereof. A spur 26 is preferably formed upon one of the tongs of each of the sets of tongs by partially detaching portions of the material constituting said tongs, and at the outer end of each of the members 17 and 18 there is provided a shoulder 27 which is substantially nothing more than a sharp or substantially a square corner.

To remove the rim of the type described from the tire the two sets of tongs 15 and 16 are hooked over the edges of both of the flanges 12 upon opposite sides of the axial center of the rim, one set of said tongs being arranged in close proximity to the end of said rim bearing the tongue 8. The latch 10 is then rotated so as to disengage the tongue 8 after which the nut 24 may be rotated by means of the handle 25 and the members 17 and 18 moved toward each other whereupon the end of said rim engaged by said tongs will be bent or deflected inwardly from the position illustrated in Fig. 1 to that shown in Fig. 4, contracting said rim sufficient to permit the removal thereof from the tire.

To replace a demountable rim on a tire of the type described the rim is first inserted in its proper position with respect to the air valve 28, the ends thereof overlapping as illustrated in Fig. 3. The tool 14 is then placed within said rim with the spur 26 on one of the tongs arranged in contact with the projection 13 nearest to the end of said rim which has secured thereto the latch 10. This projection is, however, a substantial distance from said end. The shoulder 27 upon the other screw threaded member is then placed against the projection 13 nearest to the end of the rim bearing the tongue 8 which is likewise a substantial distance from said end. The nut 24 is then rotated to move the members 17 and 18 away from each other whereupon the rim 6 will be expanded and gradually the end of said rim bearing the member 8 will be moved beyond the abutting end of said rim and drop into its proper place with the tongue 8 resting in the recess 9. The latch 10 is then turned to engage said tongue and retain the same within the recess, locking said rim upon the tire.

Having thus described my invention what I claim and desire by Letters Patent to secure is:

A tire tool comprising a pair of coaxially disposed screw threaded members, a nut having screw threaded engagement with both of said members constructed and arranged to move said members toward or away from each other, a pair of tongs pivotally attached to each of said screw threaded members, each pair of tongs adapted to grip a portion of a rim when said screw threaded members are moved toward each other to contract said rim, a spur on one arm of one of said pairs adapted to engage a projection on said rim, and a shoulder formed upon the screw threaded member bearing the other pair of tongs, said shoulder being constructed and arranged to engage another projection on said rim, whereby when said screw threaded members are moved away from each other said rim will be expanded.

In testimony whereof I have hereunto set my hand in presence of two subscribing witnesses.

FRANK H. BURRILL.

Witnesses:
  CHARLES S. GOODING,
  SYDNEY E. TAFT.